United States Patent
Lipner et al.

(10) Patent No.: US 7,813,817 B2
(45) Date of Patent: Oct. 12, 2010

(54) COMPUTERIZED PROCEDURES SYSTEM

(75) Inventors: Melvin H. Lipner, Monroeville, PA (US); Roger A. Mundy, North Huntingdon, PA (US); Michael D. Franusich, Upper St. Clair, PA (US)

(73) Assignee: Westinghouse Electric Co LLC, Cranberry Township, PA (US)

( * ) Notice: Subject to any disclaimer, the term of this patent is extended or adjusted under 35 U.S.C. 154(b) by 554 days.

(21) Appl. No.: 11/584,769

(22) Filed: Oct. 20, 2006

(65) Prior Publication Data

US 2007/0270980 A1 Nov. 22, 2007

Related U.S. Application Data

(60) Provisional application No. 60/747,714, filed on May 19, 2006.

(51) Int. Cl.
*G05B 11/01* (2006.01)
*G05B 15/00* (2006.01)
*G06F 15/16* (2006.01)
*G06F 7/00* (2006.01)

(52) U.S. Cl. .................. 700/19; 700/83; 707/104.1; 709/203; 701/35

(58) Field of Classification Search ................. 709/203; 700/19, 83; 707/104.1; 701/35, 129
See application file for complete search history.

(56) References Cited

U.S. PATENT DOCUMENTS

| | | | |
|---|---|---|---|
| 4,803,039 A | 2/1989 | Impink, Jr. et al. | |
| 4,815,014 A | 3/1989 | Lipner et al. | |
| 4,975,865 A * | 12/1990 | Carrette et al. ................. | 700/10 |
| 5,068,080 A | 11/1991 | Impink, Jr. et al. | |
| 5,553,304 A | 9/1996 | Lipner et al. | |
| 5,881,115 A | 3/1999 | Lipner et al. | |
| 6,192,281 B1 * | 2/2001 | Brown et al. .................... | 700/2 |
| 6,999,956 B2 * | 2/2006 | Mullins .......................... | 707/2 |
| 7,020,532 B2 * | 3/2006 | Johnson et al. ............... | 700/89 |
| 7,085,607 B2 | 8/2006 | Lipner et al. | |
| 2002/0129001 A1 * | 9/2002 | Levkoff et al. .................. | 707/1 |
| 2003/0060899 A1 | 3/2003 | Lipner et al. | |
| 2004/0030781 A1 | 2/2004 | Etesse et al. | |
| 2004/0102683 A1 | 5/2004 | Khanuja et al. | |
| 2005/0028024 A1 | 2/2005 | Kataoka et al. | |
| 2005/0086360 A1 * | 4/2005 | Mamou et al. ............... | 709/232 |
| 2005/0240289 A1 * | 10/2005 | Hoyte et al. ................... | 700/49 |
| 2005/0283738 A1 | 12/2005 | Beringer et al. | |
| 2006/0059253 A1 | 3/2006 | Goodman et al. | |

OTHER PUBLICATIONS

Letier et al., "Monitoring and Control in Scenario-Based Requirements Analysis" ACM 2005p. 382-391.*

(Continued)

*Primary Examiner*—Albert DeCady
*Assistant Examiner*—Thomas H Stevens

(57) ABSTRACT

An online data driven computerized procedures system that guides an operator through a complex process facility's operating procedures. The system monitors plant data, processes the data and then, based upon this processing, presents the status of the current procedure step and/or substep to the operator. The system supports multiple users and a single procedure definition supports several interface formats that can be tailored to the individual user. Layered security controls access privileges and revisions are version controlled. The procedures run on a server that is platform independent of the user workstations that the server interfaces with and the user interface supports diverse procedural views.

22 Claims, 9 Drawing Sheets

OTHER PUBLICATIONS

Press Release, "Westinghouse AP1000 Nuclear Power Plant Archives Major Milestone" 2004.*
Schulz-T.L., "Westinghouse AP1000 Advanced Passive Plant" Science Direct 2006 p. 1547-1557.*
Cummins et al. "Westinghous AP1000 Advanced Passive Plant" 2003 Proceedings of ICAPP p. 1-10.*
Portmann et al., "Computerized Procedures and Parallel Information to Guide the Operator" p. 42-44.*
Lipner-M.H., "A Computerized Procedures System for Enhanced Plant Operation" ACM,1986, p. 534-539.*
Cash et al., "Rod Width Minimizer" 1986, General Electric Company IEEE p. 1007-1014.*

* cited by examiner

| Procedure List | ● CSF Trees | E-0 | *E-0 | | | |
|---|---|---|---|---|---|---|
| Find by Name: | | Next | Previous | | Show Procedures: | All |

| Name | Title | State | Current Condition | Entry Condition | Operator |
|---|---|---|---|---|---|
| E-0 | Reactor Trip or Safety Injection | Idle | Step 25 RNO | Low Pressure Level | Franusmd |
| E-1 | Loss of Reactor or Secondary Coolant | Inactive | | | |
| E-2 | Faulted Steam Generator Isolation | Inactive | | | |
| E-3 | Steam Generator Tube Rupture | Active Step 1 | | | Franusmd |
| ECA-1.1 | LOCA Outside Containment | Inactive | | | |
| ES-0.1 | Reactor Trip Response | Inactive | | | |
| ES-0.2 | Natural Circulation Cooldown | Inactive | | | |
| ES-1.1 | Passive Safety Systems Termination | Inactive | | | |
| ES-1.2 | Post LOCA Cooldown and Depressurization | Inactive | | | |
| FR-C.1 | Inadequate Core Cooling | Inactive | | | |
| FR-C.2 | Degraded Core Cooling | Inactive | | | |
| FR-C.3 | Saturated Core Cooling | Inactive | | | |
| FR-H.1 | Loss of Heat Sink | Inactive | | | |
| FR-H.2 | Steam Generator Overpressure | Inactive | | | |
| FR-H.3 | Steam Generator High Level | Inactive | | | |
| FR-H.4 | Loss of Normal Steam Release Capabilities | Inactive | | | |
| FR-H.5 | Steam Generator Low Level | Inactive | | | |
| FR-I.1 | High Pressure Level | Inactive | | | |
| FR-I.2 | Low Pressure Level | Inactive | | | |
| FR-I.3 | Voids in Reactor Vessel | Inactive | | | |
| FR-P.1 | Imminent Pressurized Thermal Shock Condition | Inactive | | | |
| FR-P.2 | Anticipated Pressurized Thermal Shock Condition | Inactive | | | |
| FR-S.1 | Nuclear Power Generation -- ATWS | Inactive | | | |
| FR-S.2 | Loss of Core Shutdown | Inactive | | | |
| FR-Z.1 | High Containment Pressure | Inactive | | | |
| FR-Z.2 | Containment Flooding | Inactive | | | |
| FR-Z.3 | High Containment Radiation Level | Inactive | | | |
| FR-Z.4 | Low Containment Pressure | Inactive | | | |
| SDG-1 | Loss of RCS Inventory During Shutdown | Inactive | | | |
| SDG-2 | Loss of RNS During Shutdown | Inactive | | | |
| SDG-3 | High Containment Radiation During Shutdown | Inactive | | | |
| SDG-4 | Increasing Nuclear Flux During Shutdown | Inactive | | | |
| SDG-5 | RCS Cold Overpressure During Shutdown | Monitor | | | |
| SDG-6 | Unexpected RCS Temperature Changes During Shutdown | Inactive | | | |
| SGTL | Steam Generator Tube Leak | Inactive | | | |

FIG. 7

COMPUTERIZED PROCEDURES SYSTEM

CROSS-REFERENCE TO RELATED APPLICATIONS

This application claims the priority of Provisional Application Ser. No. 60/747,714, filed May 19, 2006, entitled "A DYNAMICALLY DRIVEN COMPUTERIZED OPERATING PROCEDURES SYSTEM".

GOVERNMENT INTEREST

This invention was made with government support under Contract No. DE-FC07-051D14636 awarded by the United States Department of Energy. The government has certain rights in this invention.

BACKGROUND OF THE INVENTION

1. Field of the Invention

This invention is directed to a method and apparatus for aiding an operator in executing step-by-step procedures during the operation of a complex process facility such as a nuclear power plant. More particularly, this invention involves a computer based system which incorporates plant data and interactive plant operator responses in a client/server environment in which the procedure, document and authorization databases as well as the sensor monitoring, procedure evaluator and procedure state management software modules are maintained on the server and the outputted information is formatted at any one of a number of client workstations independently of each other.

2. Background Information

As large process facilities become more complex, the burden placed on the operator to assimilate large amounts of data, evaluate the status of the process and various components and systems from those data, and take informed, decisive action based upon such evaluations, becomes greater. In view of the complexity of the process it is not unlikely that there may be any number of individuals managing or auditing the process to assure its safe operation. Such a complex process facility is a nuclear power generation plant.

Due to concern for public safety and to the significance of nuclear power generation to the world, there has been a steadily increasing emphasis on the need to operate nuclear power plants safely and reliably. To satisfy this need, written procedures have been developed to guide the operator in controlling the power plant. However, many of these procedures are difficult for the operator to manage in a purely paper format because they require him to continuously monitor and comprehend numerous plant conditions over an extended period of time.

Several attempts have been made to alleviate this problem. One such attempt has resulted in the safety parameter display system covered by U.S. Pat. No. 4,552,718. This system generates meaningful information for the operator of a pressurized water reactor (PWR) on six critical safety functions which must be maintained or reestablished if lost during emergency operation. The system uses a status tree approach to generate automatically, or through manual responses by an operator, a visual indication of the current status of all six critical safety functions. This system is used in conjunction with the paper procedures to alert the operator, who is absorbed in the steps of the particular emergency procedure, to the overall condition of the plant. While the status tree system advises the operator of any threats to the critical safety functions, and suggests a procedure to be followed, the operator must still locate the recommended procedure in the paper procedures and then follow it manually step-by-step. The status tree system also does not keep the operator apprised of other plant conditions which the paper procedures require to be monitored, but which do not directly affect the critical safety functions.

U.S. Pat. No. 4,803,039, issued Feb. 7, 1989 is directed to a computer based system which both assesses the plant data and provides guidance in light of pre-defined procedures. In this system, current plant data are used by the computer to trace a path through the logic of appropriate procedure steps in order to identify a recommended course of action. The course of action along with related data is displayed for the operator on one or more electronic display devices. The computer then uses the plant data and the operator's interactive response to proceed to the next appropriate procedure step. In addition, the computer simultaneously monitors certain functions which must normally be continuously monitored by the operator. If a problem becomes apparent in any of these functions, the operator is alerted and appropriate actions are displayed. In this manner, the operator is relieved of the duty of continually gathering and assessing large amounts of data, as required by the purely paper form of the procedures. This frees the operator to concentrate on operating the plant in a safe manner when hazardous conditions are not present, and to alleviate potential emergency situations when hazardous conditions exist.

U.S. Pat. No. 5,068,080 took such computerized procedure systems one step further enabling them to recognize successive changes in the monitored systems state and compare those changes with a preprogrammed sequence of operations and draw the operators' attention to any undesirable deviations. U.S. Pat. No. 5,553,304 furthered the evolution of these systems moving away from hard-coded software systems to the use of a relational database. U.S. Pat. Nos. 5,881,115 and 7,085,607 further advanced the state of the art in enabling the operator to absorb more data about the steps of the process and the current and historical conditions of the process while providing an overview of plant operation in a manner the operators could easily assimilate.

As these processes further evolved and the process controls developed to be more sophisticated, it became advisable to have more people involved in the control and monitoring of the process conditions, such as the developers and other experts, in addition to the plant operators. It is not practical to expect all of these people to be available at the plant on a continuous basis. Therefore, it is preferable that these individuals be able to monitor the plant remotely and, desirably, in their native languages. Therefore, there is a need to further evolve computer based procedures management systems to improve the safe operation of such complex processes.

Accordingly, it is the object of this invention to provide a computerized procedure system that runs on a secure server with the operator and other users having remote access through workstations at their own resident locations.

It is an additional object of this invention to provide a computerized procedure system that has a server that can communicate with multiple workstations having different operating system platforms.

Furthermore, it is an object of this invention to provide such a system wherein the workstation operator or other user has the capability to format the data presented on the corresponding workstation in a selected language and format that is independent of the language and format that the same information is being displayed simultaneously on other workstations at the same or other locations.

It is a further object of this invention to have each workstation's access to the server be fully secured and coordinated.

SUMMARY OF THE INVENTION

These and other objects are realized by the apparatus of this invention, for online, computer assisted execution by a human operator of procedures for a complex process facility in which the steps of a selected procedure stored in the computer memory are sequentially presented to the operator on a display device. A plurality of sensors for generating sensor signals representative of the real time value of a plurality of the process facility's parameters that indicate various conditions of the process are communicated over a network to a server. The server has one or more databases which store the procedures, related documents and authorization information. The server also houses one or more software modules that monitor the data from the sensors, evaluate the procedures with respect to the monitored data and determine the state of the procedures. The server also maintains an active log of the commands or resources requested from remote workstations where the operator and other users access selected information on the network. The server output to the workstations is communicated over a network and comprises the text and structure of the procedure, as well as associated logic and metadata, and the workstation defines the format in which the server output is presented to the operator or other user. The sequencing of the computerized procedure system is very similar to that set forth in U.S. Pat. No. 7,085,607, however, this invention further improves how those steps are processed and displayed to provide the information in a manner that is tailored independently to multiple operators and other users in a manner that they can most easily absorb, e.g., in their own diverse languages.

In particular, the computerized procedure system senses the starting conditions for automatic execution of given steps of the procedures so that when satisfied the procedure is initiated automatically. Stop conditions for automatically stopping a procedure are also established. The operator also has the option of executing the procedures manually.

Some of the procedural steps generate control signals which result in modification of process conditions. Such control signals can be automatically generated by a procedure which is running automatically. Some procedures call for verification that the control signal has been effective before advancing to the next step. In some instances, this may take some time. If the condition is not satisfied, the step is violated and the automatic sequencing will terminate requiring operator intervention. A suitable time delay can be provided to allow the command signal to take effect so that the process may continue automatically. Time delays can also be programmed into any of the steps of the procedure so that the operator may follow the sequence of steps during automatic execution.

Preferably the server has a separate procedure database for storing one or more step-by-step procedures for operating the process under various conditions; a document database for storing documents that contain background and amplification for the procedural steps stored in the procedure database; and an authorization database for storing user names, passwords and security access levels of the operators and other users authorized to access the server. Furthermore, preferably, some of the computer software modules on the server include a data monitor module for receiving, interpreting and processing the sensor signals; a procedure evaluator module for receiving the interpreted and processed sensor signals from the data monitor module and determining whether the entry conditions for entering a procedure have been satisfied; a procedure state manager module for evaluating the interpreted and processed sensor signals received from the procedure evaluator module and determining the step in one or more of the procedures from the procedure database applicable to the conditions of the process indicated by the sensor signals and sequencing the applicable procedure further; and a request handler module for managing and satisfying access and information requests from one or more computer workstations by drawing on the output of the server procedure state manager module, the document database and the authorization database to provide server output to the one or more workstations.

Desirably the client and server are platform, i.e., operating system, independent, and a client on any platform can communicate with the server on any platform. Preferably the procedure steps are stored in a plurality of languages and can be displayed on separate workstations respectively in different languages. The workstation determines the language in which the applicable steps of the procedure are displayed. The operator or other user also controls the format in diverse views of the information that is displayed on the workstation. The operator and other users access to the server is determined by a pre-authorized level of security assigned so that only selected information or selected actions may be permitted for any given user.

In one preferred embodiment an operator or user may be authorized to edit the procedures. In such case, each accepted change or series of changes in the procedures is uniquely identified and prior versions archived.

In another preferred embodiment a backup server, running the same software and having the same databases, runs in parallel with the main server and assumes control of the system if the first server goes down. Still in another embodiment the apparatus of this invention includes a logger that records and stores the time, the workstation address, the operator or other user and the command or other resource requested. In addition, the logger may record a detailed and time-stamped log of all procedure activations and step transitions, including specific data values of entry conditions for each procedure activated and data values for each step when the step is exited. Thus, the computerized procedure system of this invention operates in a secure, redundant server environment and is capable of being accessed by the operator or other users in a manner that satisfies their individual needs to best comprehend the status of process conditions.

BRIEF DESCRIPTION OF THE DRAWINGS

A further understanding of the invention can be gained from the following description of the preferred embodiments when read in conjunction with the accompanying drawings in which:

FIG. 7 is a computer generated view of a workstation display of the computerized procedures system workstation of this invention showing the procedures list;

DESCRIPTION OF THE PREFERRED EMBODIMENTS

The computerized procedures system of this invention is a data driven, software based, dynamic system that guides operators through plant operating procedures. It monitors plant data, processes the data and then, based on this processing, identifies the applicable procedure and presents the status of the procedure steps to the operator. For the AP1000, advanced passive nuclear power generating plant designed by Westinghouse Electric Company LLC, the computerized procedures system of this invention will be used for normal operating procedures, abnormal operating procedures and emergency operating procedures.

The system provides a consistent structure within which plant operating procedures are created, maintained and utilized. It will permit a reduction in the cycle time needed to implement changes in the operating procedures because each procedure will reside within the computerized system as a single file format.

The computerized procedures system of this invention combines the textural procedure information synergistically with the plant data required to determine the status of the steps and then processes that data to give the operator the status of the steps. Hence, it provides the "answers" to the procedure "questions". Additionally, the system provides singe-click links to support graphical displays and documentation that the operator may wish to view during procedure execution. The system makes an important contribution to the improved effectiveness of plant procedure execution by providing for multiple user support. There is no arbitrary limit to the number of users simultaneously accessing the system, with per user privileges and access rights, on different, client workstations, with different layers of security.

The computerized system of this invention embodies a unique user interface that supports diverse procedure views, e.g., interactive graphical flowchart view, formatted text view and dynamic logic view-all at the same time on a single display screen.

Figure 1:
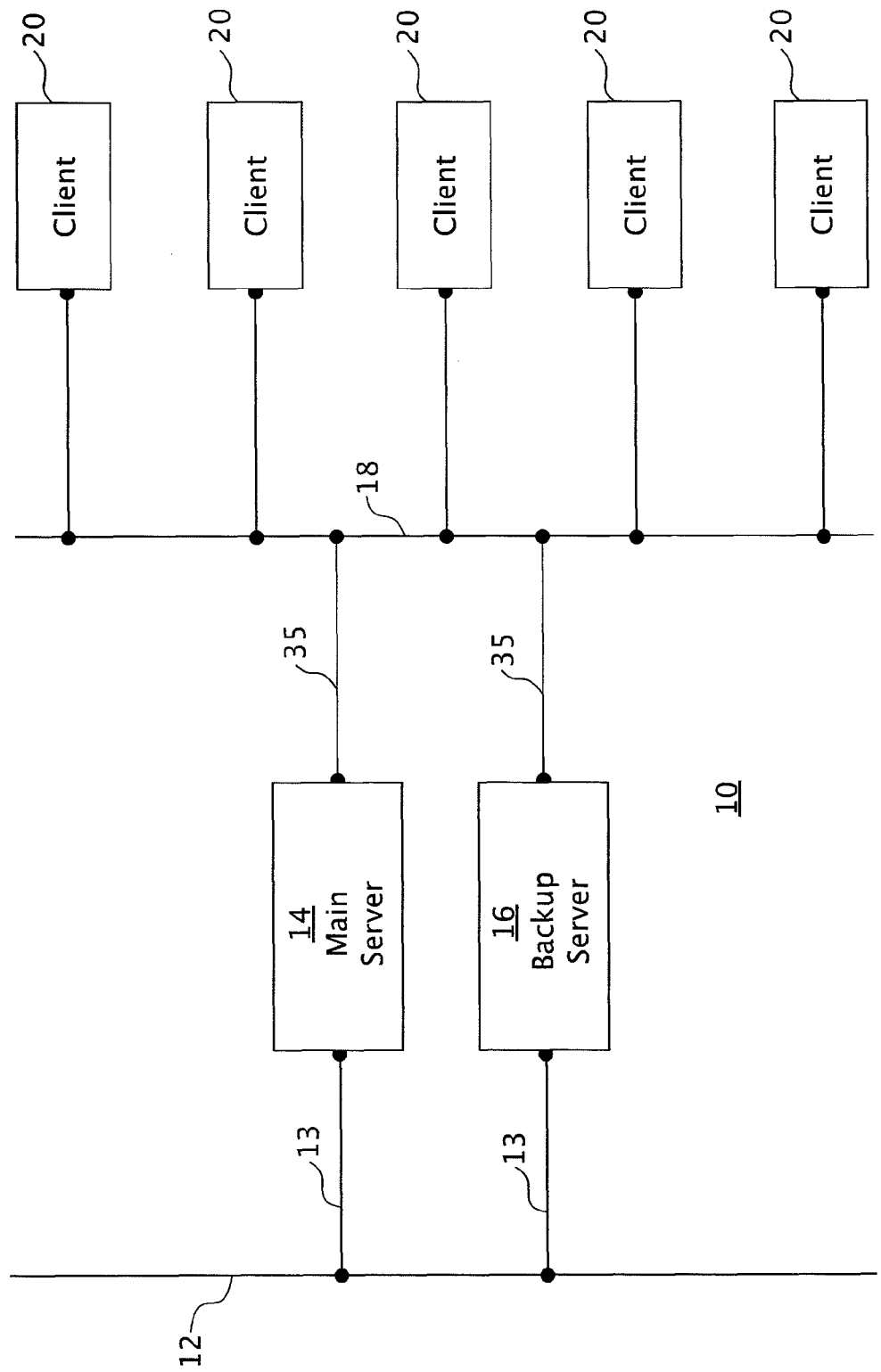
FIG. 1 is a block diagram of an overview of the computerized procedures system of this invention.

FIG. 1 shows an overview of the computerized procedure system of this invention that has two main components, the server 14, 16 and the client workstations 20. The main server 14 and backup server 16 are responsible for all dynamic information, while the client workstations 20 handle presentation of the information and the interaction with the user. The servers 14, 16 receive information from plant sensors which monitor process conditions, over the plant instrumentation and control network 12 and output information regarding those conditions and the applicable procedure steps, over an application network 18 to the various client workstations 20. The client software on the workstations 20 initiates all transactions. The server responds to client workstation requests asynchronously, i.e., while responding to the workstation requests the server continues to monitor the sensor outputs and update the procedures steps and the workstations continue to process the server outputs and place further demands on the server. There is no arbitrary limit to the number of clients 20, and all clients 20 connected to the same server are synchronized, so that, the result of an authorized action request to the server by one workstation is reflected on the display of all the workstations 20. Both the client workstation 20 and the servers 14, 16 are platform independent. That means a client on any platform can communicate with the server on any platform. Thus the server may run on any operating system platform such as multiple versions of UNIX and Windows operating systems while the client workstations may run on different ones of the multiple versions of UNIX or Windows operating systems. Furthermore, each of the client workstations 20 may run on different operating system platforms as well without degrading communication. All communications between a client workstations 20 and server 14, 16 use HTTP (Hypertext Transfer Protocol Overview) initiated by the client workstations 20. HTTP is a protocol used by the worldwide web. Data and computerized documents are passed as XML (Extensible Markup Language), another convention employed on the web. Optionally, the communications can be compressed and/or encrypted. Static content, such as online copies of paper documents and online help are delivered in PDF or HTML format.

The text of the procedures and background and supporting documents that may be used for reference are stored in multiple languages and may be displayed on different client workstations 20 in different languages. The state of the procedure system is independent of whether client workstations 20 are currently running or not. The server 14, 16 handles authentication and authorization approval of the operator or other users. The server 14, 16 can control all the way from totally blocking a connection to allowing unlimited access on a per user basis. For example, a user may be provided with read-only privileges if the user's sole reason for accessing the computerized procedures system is to monitor the state of the procedures. Additionally, specific actions and information can be access controlled by the server on a per user basis on a document-by-document or procedure-by-procedure degree. The client software on a workstations 20, connects to a server and gets all plant data, system status, and other related information from the server. The client software on the workstations 20 is dedicated to interfacing with the server 14, 16 in carrying out the tasks of the computerized procedures system of this invention, though it should be appreciated that the workstations may simultaneously run other software and receive and communicate other information that may be related or totally unrelated to the procedures processed by the system of this invention. All state information originates in the server, that the authorized users control from the client workstations 20 through requests for specific procedures or actions. The procedure document from the server contains the text and structure of the procedure, as well as associated logic and metadata. From that single procedure document, the client builds the flowchart, text and logic panes for the procedure. Individual users can configure many display options, such as fonts, colors, panel sizes, etc. Options are saved between sessions. The presentation of the procedures and procedure related information is controlled by the client on the workstations 20. For example, the server sends the client the abstract structural descriptions of the logic trees, along with the associated text, decision logic, and current values for nodes, but it is the client workstations 20 that uses that abstract information to build the displays of the trees. The server has no knowledge of screen layout, colors, shapes, fonts, etc.

FIG. 1 shows the main server 16 connected to the plant instrumentation and control network 12 from which it receives the sensor signals 13 that also include information on the quality of the data being received. The server's procedures output 35 is communicated through an application network 18 to the client workstations 20. An optional backup server 16 is connected in parallel with the main server 14 and includes the identical databases, computer software modules and sensor information as the main server 14. Processing will automatically transfer over to the backup server 16 should the main server 14 fail for any reason.

Figure 2:
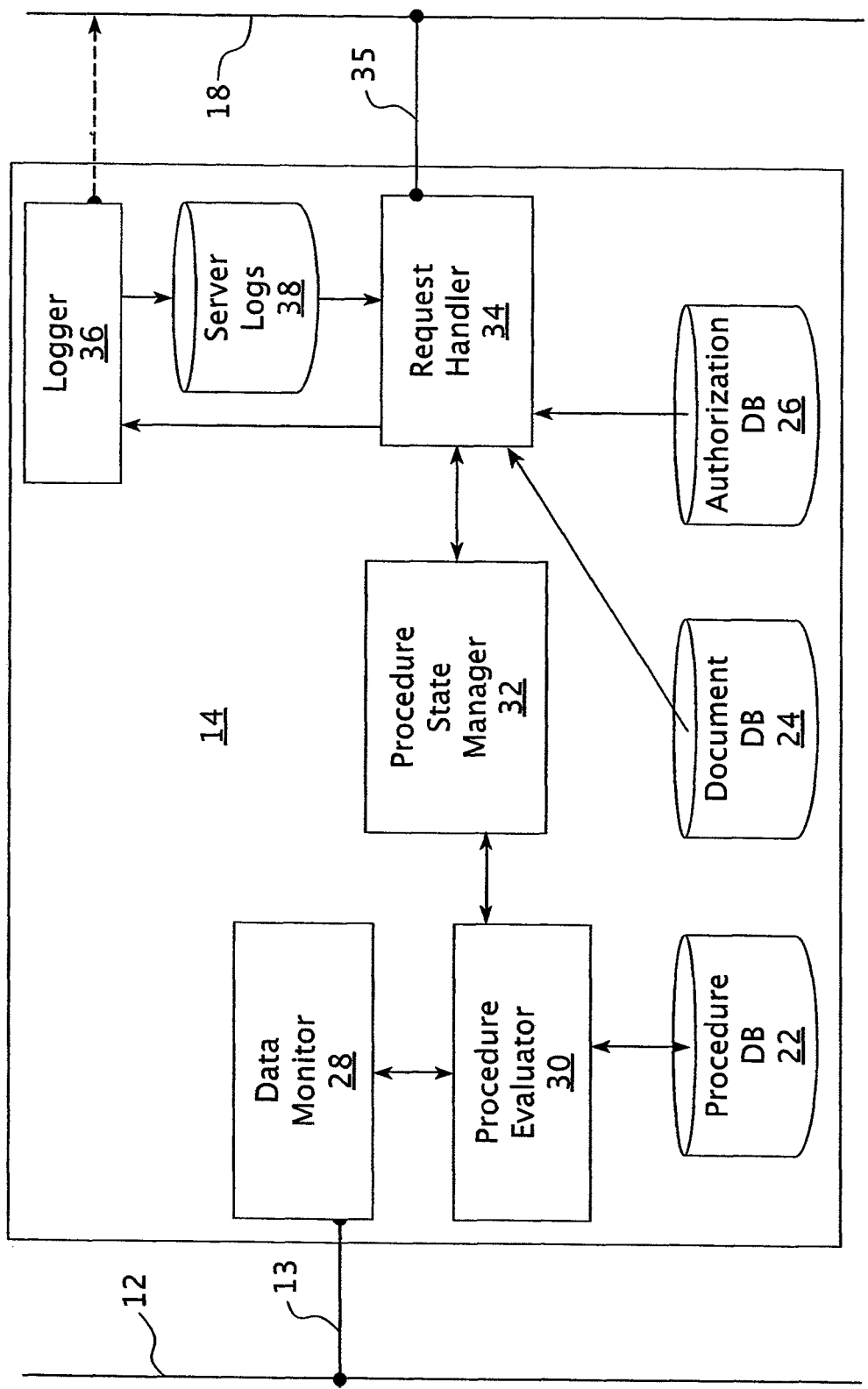
FIG. 2 is a block diagram of the computerized procedures systems server illustrated in FIG. 1.

FIG. 2 is a more detailed block diagram of the computerized procedures system server 14 though it should be appreciated that the same components are employed by the backup server 16 previously shown in FIG. 1. The procedure database contains all the procedure information, including the abstract structural descriptions of the procedural logic trees, along with the associated text in several languages and metadata. The procedure database 22 communicates with a procedure evaluator computer software module 30 that also receives input from a data monitor 28 that processes and conditions the sensor signals 13. The procedure evaluator compares the sensor signals with the entry conditions required for the start of the several procedures and identifies the appropriate procedures whose entry conditions are satisfied. The procedure evaluator software module 30 communicates with a procedure state manager computer program software module 32 which monitors the state of the procedure and at the option of the operator either automatically implements and advances the consecutive steps of the procedure as each step is satisfied or manually takes the action directed by the client workstations 20 through the request handler computer software module 34. The request handler computer software module 34 communicates requests and directions from the client workstations 20 which are conveyed over the application network 18 and communication link 35. The server 14 also has a logger 36 that monitors and records the steps of the procedures, entry conditions and other data from the procedure state manager 32, all of which is time-stamped. The requests and directions from the client workstations 20 are processed through the application network 18 and communication link 35, by way of the request handler computer software module 34. The server logs are stored in database 38 and can be requested by the workstations 20 through the request handler 34. The document database 24 stores background documents concerning the procedure and other reference material that might be helpful to the operators, in several languages. This information is available to the operators through the client workstations by requests made to the request handler 34. The authorization database 26 stores all of the information about authorized users and can verify a request for access through the request handler 34.

The server has two main processing tasks. The first is to evaluate pertinent plant data supplied by the sensors through the client instrumentation and control network 12. The second is to process client requests that are made through the client workstations 20 and communicated over the application network 18 to the request handler 34. When the server first starts or is reset it loads the procedure definitions from the procedure database 22 and finds those with entry conditions as determined by the procedure evaluator 30. A procedure can become active by having its entry conditions satisfied or by a user action through the client workstations 20. When a procedure becomes active, the server 14 monitors the plant data for the current step, along with related parallel information, through the procedure state manager 32. A procedure can be inactive, i.e., not running; monitored, i.e., running automatically while being monitored; active, i.e., running under the step-by-step direction of an operator; idle, i.e., waiting for data that indicates the preconditions for the next step to be taken has been satisfied; or done, i.e., cycled through its full complement of steps. All data has an epoch-based time-stamp for synchronization and network efficiency.

Figure 3:
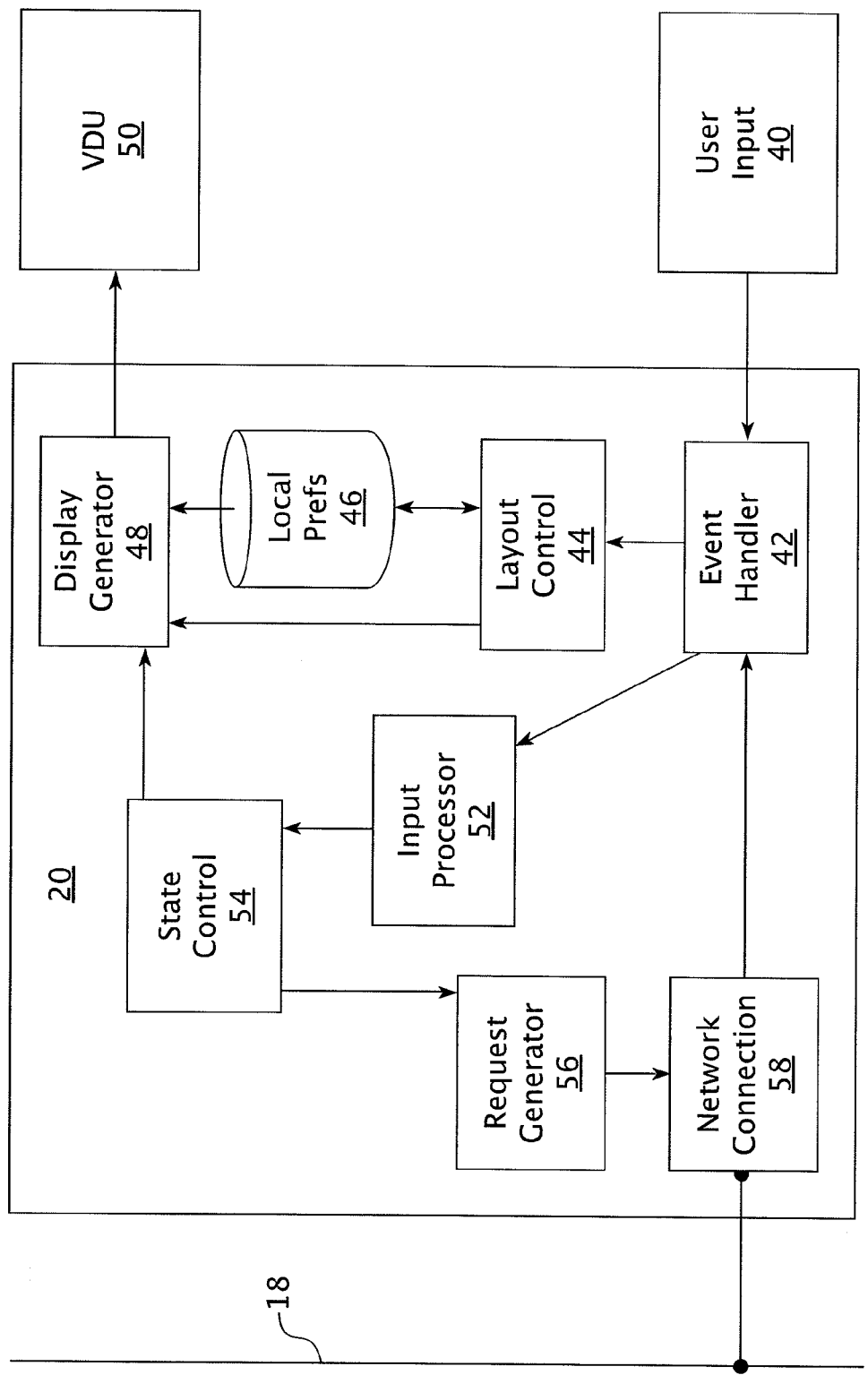
FIG. 3 is a block diagram of the computerized procedures system's client illustrated in FIG. 1.

FIG. 3 is a more detailed block diagram of the client software running on the workstations 20. All the inputs from the operators and other users are supplied through the user input 40 to an event handler software module 42. Depending upon the nature of the input the event handler can communicate with the network connection card 58 through the processor 52, State Control 54 and Request Generator 56, if it is a network event or if the input concerns the format of the display interface, with the layout control software module 44. The layout control software both stores the layout preferences in a local memory storage unit 46 and communicates that information to the display generator 48, which formats the information supplied by the state control software module 54 to build the display which is presented on the video display unit 50. The request generator 56 periodically requests updates on the state of the process and the process data is updated through the state control software module 54 to the display generator. When the client polls, i.e., requests, a dataset from the server the request may include an optional time-stamp argument. If a time-stamp argument is included in the request the workstation will receive an empty reply if nothing has changed since that time. By excluding the time-stamp argument the client can synchronize with the current state of the server.

When the client starts up the workstations 20 it connects to the server 14, which authenticates the session. The client requests state information from the server through the state control software module 54 and request generator 56 and builds its display through the display generator 48 based on the system state and user preferences obtained from the local preference memory 46 saved during the last session. At regular intervals the client workstations 20 ask the server for any new information which keeps all the clients synchronized. A change initiated from one client workstation 20 will quickly display on all other connected client workstations 20.

Under the user's control, the client workstation requests specific procedures. The procedure document from the server 14 contains the text and structure of the procedure as well as associated logic and metadata. From that single procedure document the client builds the flowchart, text, and logic panes for the procedure. If the server is monitoring data for a procedure the client asks for updates to that data at regular intervals.

Figure 4:
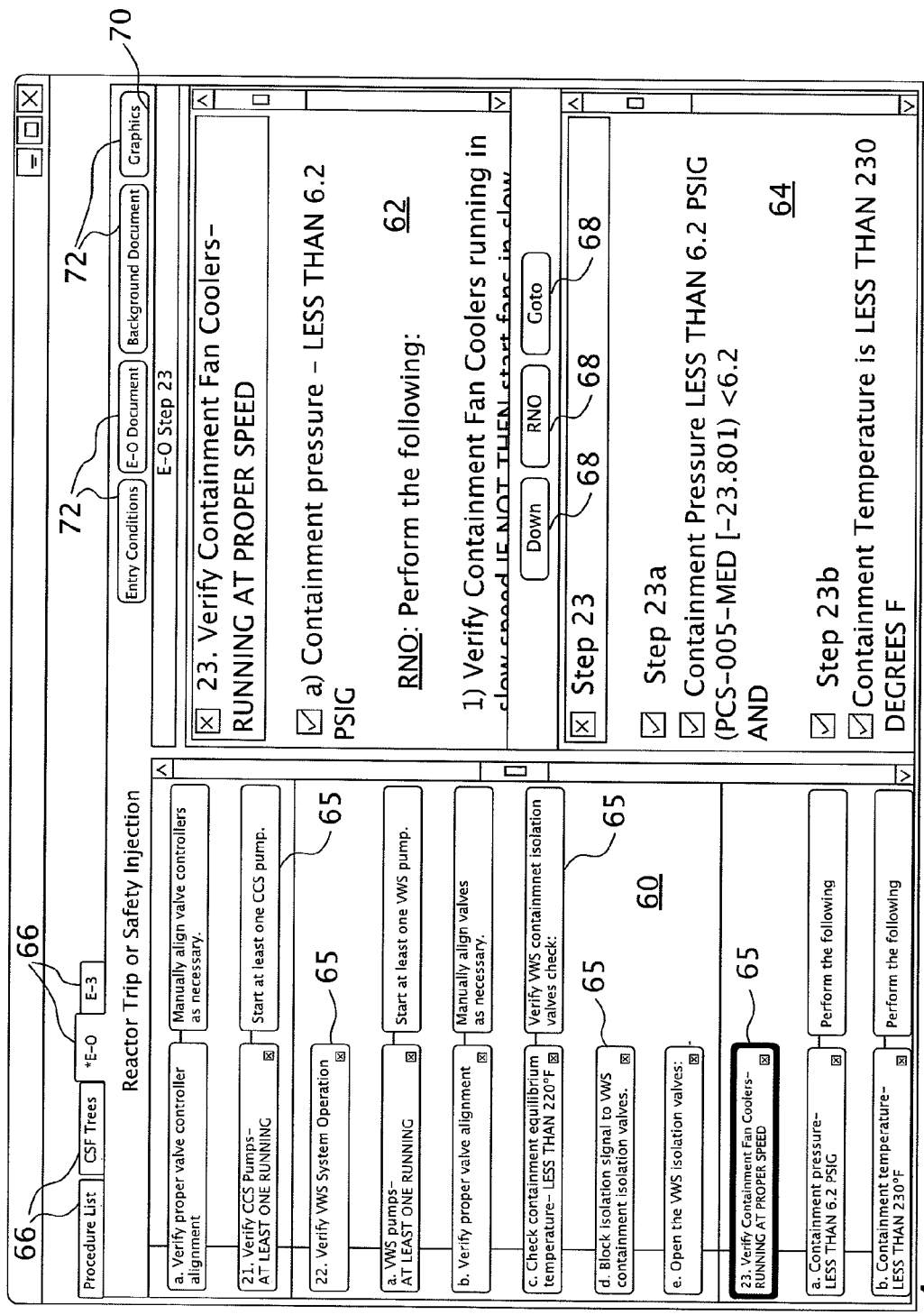
FIG. 4 is a computer generated display of three diverse views of the same step of a procedure generated by a client of the computerized procedure system of this invention.

The procedure display that is projected on the video display unit 50 is illustrated in FIG. 4. There are three main panes in the procedure display, i.e., flowchart 60, text 62 and logic 64, all synchronized to show different views of the same thing. The flowchart 60 shows an overview of the procedure's structure and flow with a focus on the current step 23. There is text in each box 65 that summarizes the step. The text in each box 65 can be expanded upon by hovering the cursor over the appropriate box. Most if not all of the outlined areas on the display are context sensitive in that when relevant to a particular step outlined areas will be available and active and hovering over them will open text that further explains the outlined area's function. The user can click on any node to set the focus and/or navigate through the flowchart. Hovering, navigating, actively highlighting, moving the cursor, or pressing the mouse can all be used to display text. The flowchart display is automatically scaled to fit the width of the panel. The steps that are satisfied are shown in the lower right corner of each box on the left hand side of the flow chart display 60 with a green check while those that are violated are shown with the red X in the same location. The text display 62 is shown in the upper right region of the display and shows the full text of the current step, formatted to look like the paper version. RNO which stands for Response Not Obtained, is indented instead of being set out in a separate column. The RNO identifies an alternative step that needs to be taken if the expected response to the previous step is not obtained. The active or focused node, in this case 23, is highlighted. The context sensitive navigation buttons 68 are either shown with dark print and outlining or are grayed-out depending whether they are applicable to the particular step highlighted. In this case, step 23 has no RNO or GOTO navigation command applicable. However, if the step 23(*a*) was highlighted the RNO and GOTO navigation buttons 68 would be shown as active. The logic portion of the display 64 is shown in the lower right portion of the screen and displays the logic for the current step, i.e., the logic for the active/focus node highlighted. Checks and X's respectively show true/false conditions for the logic conditions specified. Values of variables along with an indication of the quality of the data are shown in square brackets. The user controls the font size and color. The buttons 72 in the upper right header of the display, when activated, will provide information on the entry conditions for the procedure, a copy of the specific procedure document, background documents that may help the user better understand the procedure and graphics 70 which are relevant to the current step of the procedure that is highlighted.

Figure 5:
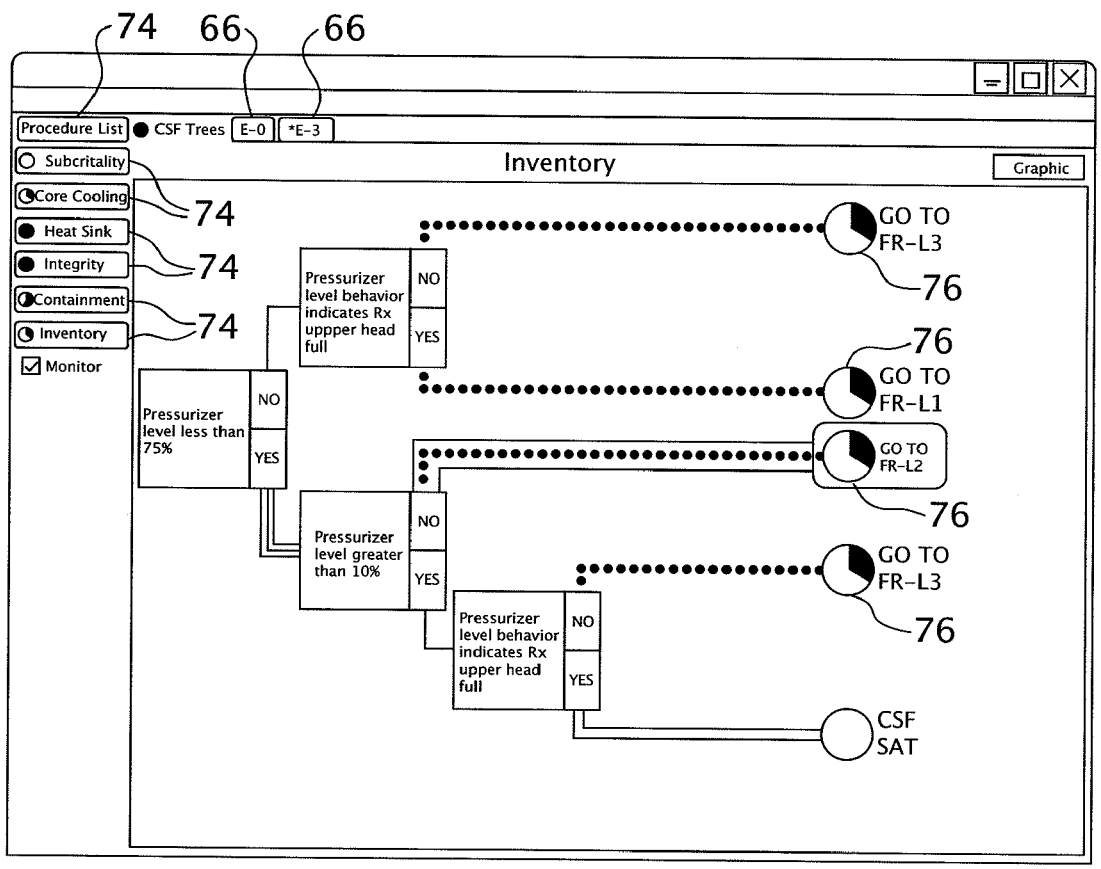
FIG. 5 is a computer generated view of a status tree display presented by a client of the computerized procedures system of this invention.

When the CSF trees tab 66 is selected the screen transfers to the display illustrated in FIG. 5. CSF stands for Critical Safety Function, which displays a logic tree for six separate critical functions that are constantly monitored, regardless of the other procedures being followed, to assure plant safety. The six critical functions are sub-criticality, i.e., to assure that the fissionable reactions within the core are being maintained below that which would create a sustained chain reaction, as measured by the in-core and ex-core neutron detectors; core cooling, i.e., the exit temperature of the reactor coolant as measured by the in-core thermocouples; heat sink, i.e., the level of the steam generator secondary feed water as measured by the feed water level sensors; integrity, i.e., the pressure in the primary side of the plant as measured by the reactor coolant system pressure sensors; containment condition, i.e., the temperature, pressure, humidity, etc., of the environment in the containment, as measured by local sensors; and coolant inventory, i.e., the level of coolant within the core as measured by pressurizer coolant level, as shown in FIG. 5. In the upper left corner of the CSF trees display below the tabs 66 are six buttons one for displaying the logic tree for each of the Critical Safety Functions. Each button 74 has an icon on its left representative of the state of the Critical Safety Function (CSF) that it represents. Solid red would indicate the most serious state while solid green would indicate normal operation; with shades in between indicating gradients of states from worst to best. The CSF tab 66 also has an icon on the extreme left that indicates the most serious state among the six Critical Safety Functions, however the operator cannot tell which function is in the most serious state without opening the window illustrated in FIG. 5 by clicking on the CSF tab 66. The icon for the highest priority CSF comes up first when the tab 66 for the CSF trees is actuated. The trees are identical to the paper version of the procedures with added highlighting of the current path. The operator can navigate to the procedure from the corresponding terminus 76 shown on the far right of the display. The relevant CSF trees display takes priority over the display shown in FIG. 4 if the corresponding critical safety function indicates an emergency condition. The CSF tree displays are themselves prioritized in order in which the buttons 74 are listed in FIG. 5.

Figure 6:
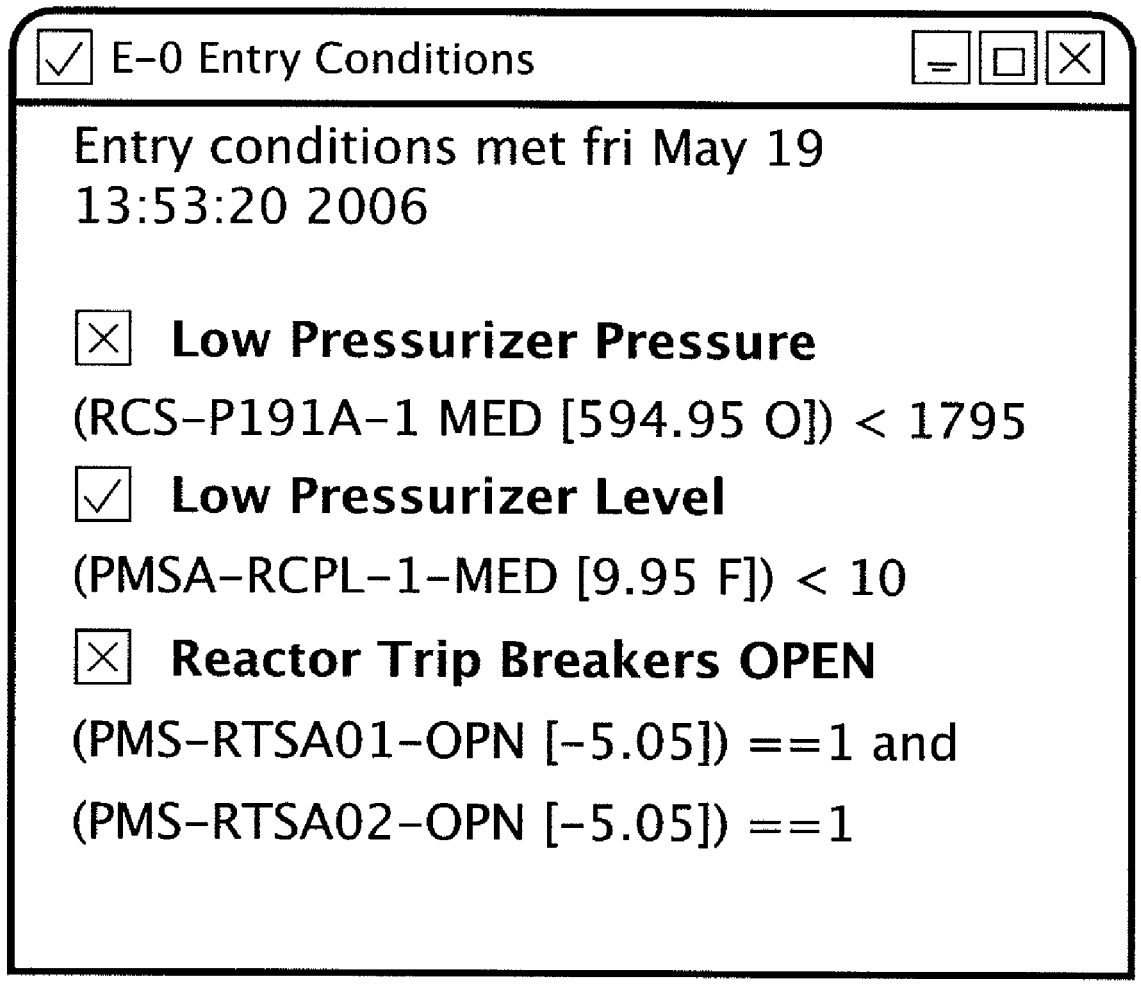
FIG. 6 is a computer generated display illustrating another view showing the entry conditions for entering a procedure of the computerized procedures system of this invention.

If the entry conditions button 72 shown in FIG. 4 is actuated a pop-up box like the one illustrated in FIG. 6 is displayed showing the entry conditions for the corresponding procedure. In other words, the pop-up box shown in FIG. 6 displays the conditions that must be met to enter, in this case, procedure E-0; step 23 of which was highlighted in FIG. 4. The checks and X's in the boxes on the left of FIG. 6 show whether the conditions have been met and the actual values for the monitored parameters are shown in brackets. The brackets also show the quality of the data with the O within the brackets of the low pressurizer pressure condition indicating that the corresponding pressure sensors are "OFF SCAN" and the data within the brackets is old data. Typically the sensor output signals are scanned once a second to update the data readings unless they are taken off line or for some other reason stop transmitting. The "F" within the brackets under the "Low Pressurizer Level" label means the data is of fair quality. "P" would stand for poor quality, "B" would stand for bad quality and no quality indication means the data is good. Once a condition is met and the corresponding procedure is entered, the entry condition display stops updating and provides a record of what caused entry to the procedure.

If the procedure list tab 66 is actuated the procedure directory illustrated in FIG. 7 is displayed showing all available procedures. The list is sortable by columns and can be searched within each column. The directory shows the state of each procedure, the operator that entered and is operating the procedure, the step the procedure is in and the entry condition which was the reason for the procedure being activated. The user has the ability to filter the list, e.g., only have the active procedures showing, to aid the user in monitoring the list.

The computerized procedure system server supports an editor client for creating and modifying the procedures. The procedure can be viewed in the editor as it will be seen in the runtime client. The procedure is contained in one file that includes the text, structure, logic and metadata. The stored procedures contain the combined information for multiple methods of display along with the logic for evaluating the state of the process. From the stored procedure the system can generate a paper printout, build the client displays, and evaluate the state of the plant in relationship to the procedure. As previously mentioned the text can be in multiple languages. The main unit in the procedure is a step which may include substeps, RNOs, notes and cautions, all of which can be edited.

Figure 8:
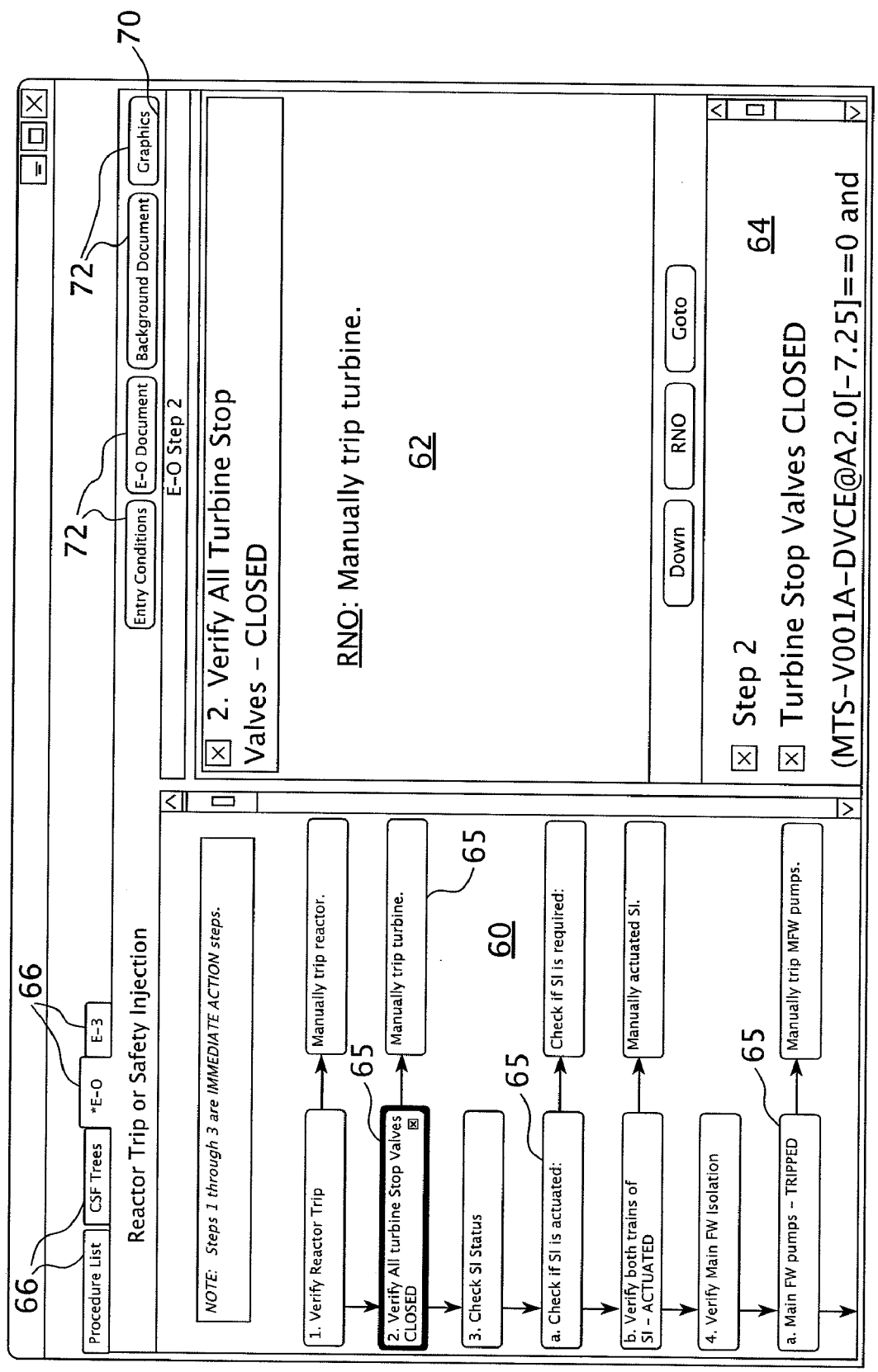
FIG. 8 is another computer generated view of a client display of this invention similar to that illustrated in FIG. 4.
Figure 9:
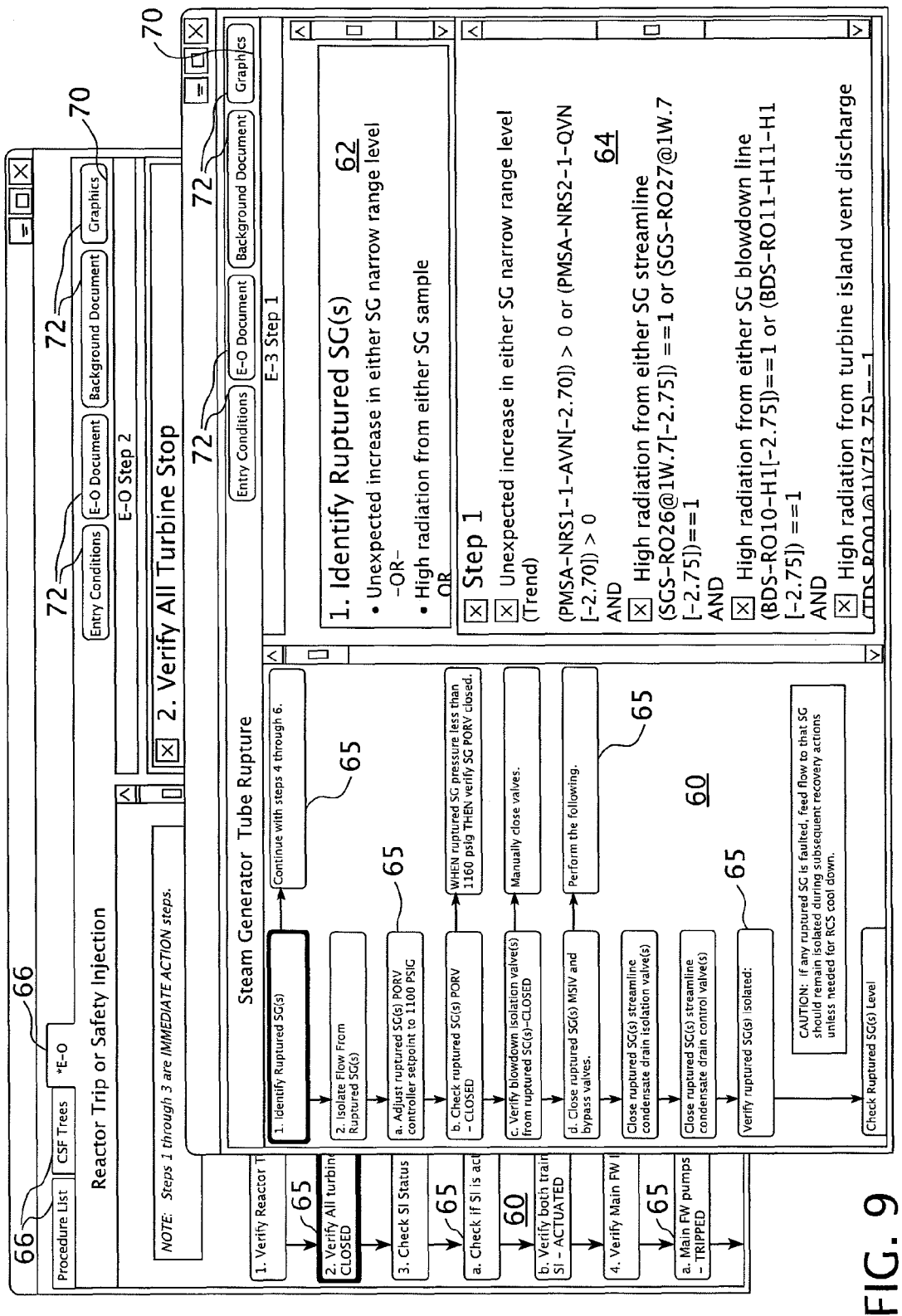
FIG. 9 is still another computer generated view of a client display of this invention illustrating a second window opened from the view of FIG. 8.

FIG. 8 illustrates another view of the procedures display previously illustrated in FIG. 4. FIG. 8 shows another step of the E-0 procedure and by comparing the two windows illustrated in FIGS. 4 and 8 some differences in formatting can be appreciated. If the cursor is left clicked on the tab E-3 in the view shown in FIG. 8 and dragged, a separate window opens up and shows the current step of the E-3 procedure, in this case Step 1 as shown FIG. 9. The separate windows can be positioned on the screen so that they are completely visible to the operator so that the operator can run two or more procedures simultaneously. That is, operator A can run procedures A and B simultaneously on the same or different workstations or operator A can run procedure A and operator B can run procedure B simultaneously on the same or different workstations.

All requests to a server from a client are logged. Each log entry contains at least the time, the client address, the user, and the command or resource requested. A more detailed log is kept of active procedures. A detailed and time-stamped log is kept of all procedure activations and step transitions. The specific data values of the entry conditions are logged, and the data values for each step are logged when the step is exited. All of this information is available at the workstations 20 of authorized users.

Thus, the computerized procedure system embodies a unique user interface that supports diverse procedure views, e.g., interactive graphical flowchart view, formatted text view and dynamic logic view that presents a wealth of information to the operators and those monitoring the process in a manner that can be easily assimilated. While specific embodiments of the invention have been described in detail, it will be appreciated by those skilled in the art that various modifications and alternatives to those details could be developed in light of the overall teachings of the disclosure. For example, it should be appreciated that the term database has been used in describing the preferred embodiment in a very general sense as a collection of data or other information organized for rapid search and retrieval and should not be construed as limited to any particular database format. Accordingly, the particular embodiments disclosed are meant to be illustrative only and not limiting as to the scope of the invention which is to be given the full breath of the appended claims and any and all equivalents thereof.

What is claimed is:

1. Apparatus for displaying applicable steps of a procedure to assist one or more operators in an execution of procedure steps in a complex process facility to manage a complex process and other users to monitor the complex process, comprising
    a plurality of sensors for generating signals representative of a real-time value of a plurality of facility parameters that indicate various conditions of a process;
    a server having one or more databases and computer program modules in electrical communication with said sensor signals and operable to provide a server output along a computer network that identifies the steps of a procedure applicable to the process conditions identified by the sensor signals wherein the one or more databases comprise:
        a procedure database for storing one or more step-by-step procedures for operating the process under various conditions;
        a document database for storing documents that contain background and other reference material for the procedural steps stored in the procedure database; and
        an authorization database for storing user names, passwords and security access levels of operators and other users authorized to access the server;
    one or more workstations connected to the computer network for receiving and displaying the server output and for requesting information from the server wherein the server output comprises a text and structure of the procedure, as well as associated logic and meta data and the workstation defines a format in which the server output is presented to the operator or other user; and
    a request handler module for managing and satisfying access and information requests from the one or more computer workstations by drawing on outputs of the procedure data base, a document database and an authorization database to provide the server output to the one or more workstation.

2. The apparatus of claim 1 wherein the one or more computer program modules comprise:
    a data monitor module for receiving, interpreting and processing the sensor signals and providing an interpreted and processed sensor output;
    a procedure evaluator module for receiving the interpreted and processed sensor signals from the data monitor module and determining whether entry conditions for entering the applicable procedure have been satisfied;
    a procedure state manager module for evaluating the interpreted and processed sensor signals received from the procedure evaluator module and determining a step in the procedure applicable to the conditions of the process indicated by the sensor signals and sequencing through the applicable procedure steps; and
    wherein the request handler module manages and satisfies access and information requests from the one or more computer workstations by drawing on outputs of the procedure state manager module, the document database and the authorization database to provide the server output to the one or more workstations.

3. The apparatus of claim 1 wherein the server output can accommodate any operating system platform run on the workstation.

4. The apparatus of claim 1 wherein the procedure steps are stored in the procedure database on the server in a plurality of languages including at least two workstations wherein applicable steps of the procedure are displayed on the workstations in different languages.

5. The apparatus of claim 4 wherein one or more documents are stored on the document database on the server in a plurality of languages.

6. The apparatus of claim 4 wherein the workstation determines the language in which the applicable steps of the procedure are displayed.

7. The apparatus of claim 1 wherein the operator or other user, at one workstation, may have different security levels of access to information on the server and to control the process than other users at other workstations.

8. The apparatus of claim 7 wherein the information to be accessed and actions permitted to be taken for each user can be controlled individually.

9. The apparatus of claim 7 wherein a security level of access is chosen from a group of access rights comprising rights to monitor only, rights to monitor and control the process, and rights to edit the procedural steps in the procedure database and/or the computer program modules.

10. The apparatus of claim 1 including means for uniquely identifying each accepted change or series of changes in the procedure and/or database information and archiving prior versions.

11. The apparatus of claim 1, including a plurality of workstations wherein each workstation supports diverse procedure views independent of other workstations.

12. The apparatus of claim 1 wherein the server is a first server, further including a second server wherein the second server includes the databases and computer program modules that are the same as the first server and is connected to a same sensor network and a same workstation network as the first server so that the second server receives any changes in the databases, computer program modules and any other information that the first server receives and the second server automatically takes over communications with the workstations if the first server fails.

13. The apparatus of claim 1 wherein one or more of the databases includes the procedures database that includes a complete definition of the procedure as a single file that comprise the text, structure, associated logic and meta data of the procedure.

14. The apparatus of claim 1 wherein data from the sensors is time-stamped and stored.

15. The apparatus of claim 14 wherein when a operator or other user from a workstation includes a sensor data update with an optional time-stamp argument the server will provide an empty reply if nothing has changed since a time identified in the optional time-stamp argument and if the time-stamp argument is not included the workstation will synchronize with a current state of the server.

16. The apparatus of claim 1 including a logger that records and stores the time, a workstation address, the operator or other user and a command or other resource requested.

17. The apparatus of claim 16 wherein the logger records a detailed and time stamped log of all procedure activations and step transitions, including specific data values of entry conditions and data values for each step when the step is exited.

18. The apparatus of claim 1 wherein the format defined by a client software running on the workstation includes a windows environment in which procedure information of interest is displayed in a first window, wherein the display in the first window includes at least one tab, corresponding to procedure information not displayed in the first window, that when the tab is activated opens a second window displaying the procedure information not displayed in the first window and wherein dragging the tab in the first window displays the first and second windows concurrently.

19. The apparatus of claim 18 wherein the first window displays a step of a first procedure and the second window displays another step of a second procedure.

20. The apparatus of claim 19 wherein the first procedure and the second procedure are executed concurrently.

21. The apparatus of claim 18 wherein the tab in the first window includes an icon that provides information on a state of the corresponding procedure information.

22. The apparatus of claim 1 for executing a first procedure and a second procedure concurrently wherein the first procedure and the second procedure are run on a same or separate workstations in separate windows.

* * * * *